Nov. 21, 1933.          O. J. SOUCIE          1,936,440
NUT LOCK
Filed March 17, 1933
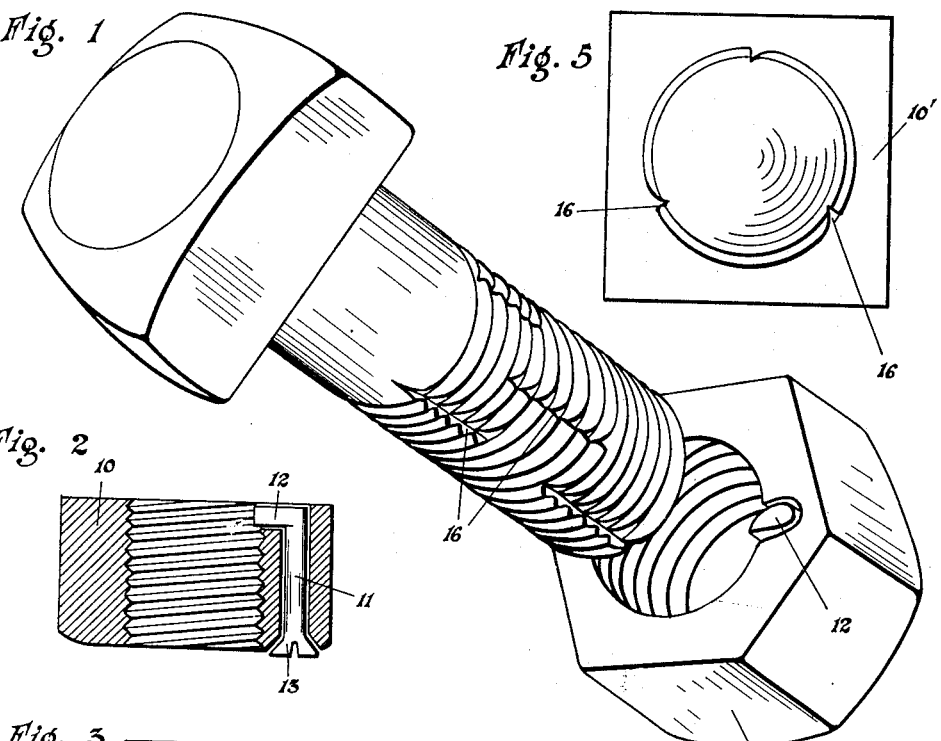
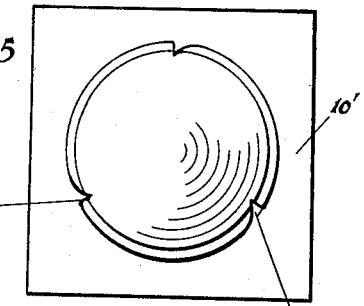
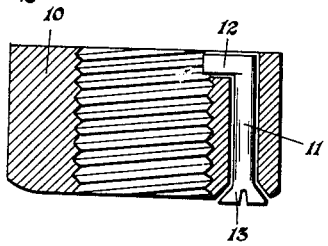
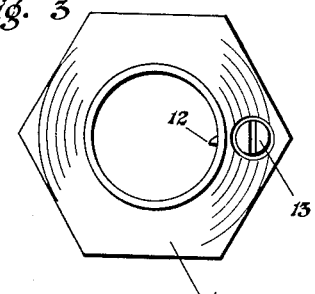
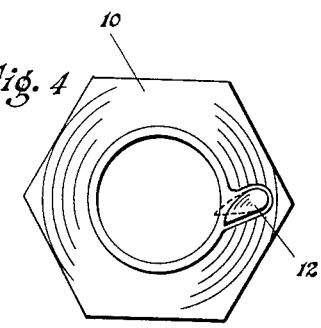
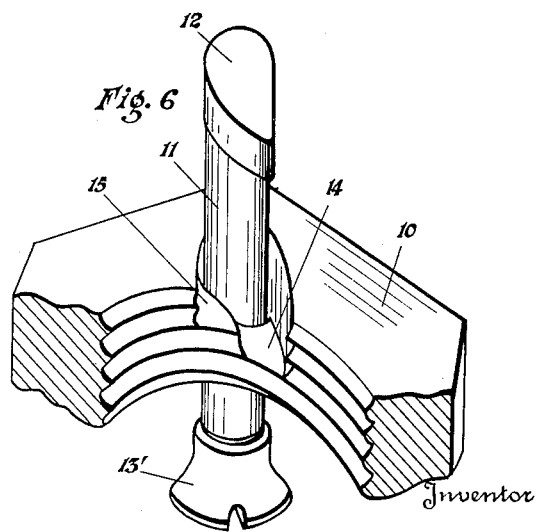
Inventor
O. J. Soucie Patented Nov. 21, 1933

1,936,440

UNITED STATES PATENT OFFICE 1,936,440

NUT LOCK

Octave Joseph Soucie, Lincoln, Nebr.

Application March 17, 1933. Serial No. 661,331

1 Claim. (Cl. 151—12)

My invention relates to nut locks and its primary object is the provision of a nut lock for firmly securing the nut to its bolt.

Another object of the invention is the provision of a nut lock which may readily be unlocked when it is desired to remove the nut from the bolt.

Another object of the invention is the provision of a pawl secured to the nut, the pawl being so arranged that it does not interfere with the turning of the nut in one direction on the bolt, but so that it prevents undesired reverse turning of the nut.

Another object of the invention is the provision of a nut lock which is a more or less permanent part of the nut and bolt to thereby avoid the misplacement of the parts of the nut lock.

More specifically, an object of the invention is the provision of a pin secured to the nut and having a rocking movement therein, the pin being provided with a pawl which permits turning of the nut in one direction on the bolt but which prevents reverse turning of the nut.

Having in view these objects and others which will be pointed out in the following description, I will now refer to the drawing, in which Figure 1 is a view in perspective of a bolt and its nut as they appear when provided with my nut lock.

Figure 2 is a diametrical section of the nut and shows particularly the locking pin and pawl.

Figure 3 is a face view of the outer face of the nut.

Figure 4 is a view similar to Figure 3, but showing the inner face of the nut.

Figure 5 is a face view of a square nut and of the end of the bolt and showing particularly the form of the notches for receiving the pawl.

Figure 6 is a view in perspective of a broken portion of the nut and showing the pin with its pawl and showing particularly the two seats for holding the pawl in its operative and its inoperative positions.

The nut 10, shown in Figure 2, is provided in its annulus with a bore for receiving a pin 11. The pin 11 terminates at its inner end in a pawl 12 having the shape best shown in Figure 4. The pin 11 has limited rocking movements in the bore of the nut 10 and it also has limited sliding movements. The outer end of the pin 11 is in the form of a countersunk screw head 13. In Figure 6 I show two seats 14 and 15 for seating the pawl 12, the seat 14 retaining the pawl in its inoperative position while the seat 15 receives the pawl while in its operative position as a nut lock. The seating of the pawl 12 on either of the seats 14 or 15 necessitates a very slight sliding movement from one level to another and it also necessitates a very slight rocking movement as shown in full and dotted lines in Figure 4. The recess in the nut 10 is slightly larger than the pawl 12 and it is so formed with reference to the curve of the pawl 12 that the pawl will be free to be rocked between its operative and its inoperative positions. It will be evident from an inspection of Figure 4 that the pawl 12 in its full line position will entirely clear the threads of the nut and that its sweeping convex surface will prevent the engagement of the pawl with the bolt while the nut 10 is being screwed thereon. Reverse movements of the nut will tend to cause the pawl 12 to engage the bolt.

The screw head 13 not only prevents the release of the pin with its pawl 12 from the nut 10, but it also gives a certain amount of control over the pawl 12 which in itself is entirely inaccessible. Should the bore become filled with oily lint or other debris and thus prevent the automatic operation of the pawl 12, it is an easy matter to shift the pawl 12 into its operative position by applying a screw driver to the screw head 13. Likewise the pawl may be shifted to its inoperative position when it is desired to release the nut lock.

The bolt also has been modified. As shown in Figures 1 and 5, a number of grooves 16 are cut in the screw portion of the bolt. These series of grooves are in spiral arrangement with relation to the bolt and each groove extends beyond both limits of the two adjacent grooves. In other words, before the pawl 12 reaches the extremity of one of the grooves it is ready for engagement with the next adjacent groove. While the nut is being screwed onto the bolt the pawl 12 may be in either the full-line position or the dotted line position of Figure 4, as it merely slides over the grooves 16 which does not interfere with the turning of the nut. At the completion of the turning movement of the bolt 10, the pawl 12 will seat in one of the grooves 16 to prevent reverse turning. Should the vibration cause a reverse turn the reverse turn will be limited by the position of the next adjacent groove 16 into which the pawl 12 will lock. It would be possible to prevent even this slight turning movement by giving a slight extra twist to the bolt 10 to seat the pawl in the next groove 16.

Attention is called to the important function of the seats 14 and 15. When the pawl 12 is seated on the seat 14 it occupies the full-line position of Figure 4 and it cannot be engaged into locking position with the nut. When the pawl 12 is seated on the seat 15 it occupies the dotted line position of Figure 4 in which it positively retards reverse movement of the nut at every point. The frictional action of the bolt also tends to keep the pawl 12 on the seat 15. It is also an easy matter to move the pawl 12 from one seat to another as this merely requires a slight action on the head 13.

Numerous slight modifications are possible without affecting the spirit of the invention. The nut is shown in hexagonal form but it is obvious that the same nut lock could be applied to any nut regardless of its shape. In Figure 5 I show a square nut 10'. The countersunk screw head 13 may also be modified as shown as 13' in Figure 6. In this case the pin 11 is screw threaded for the reception of a screw head 13' in the form of a cap. This form has certain advantages over the integral form of Figure 2, as the cap 13' and the pin 11 may be much more easily assembled or disassembled.

Having thus described my invention in such full, clear, and exact terms that its construction and operation will be readily understood by others skilled in the art to which it pertains, what I claim as new and desire to secure by Letters Patent of the United States is:

In combination, a bolt and a nut, said nut being provided with a bore in close proximity to the threaded surface thereof, the bore terminating in sockets at both of its extremities, a pin rockably and slidably secured in the bore, a pawl integral with said pin at one extremity thereof, a pair of seats at different levels in the socket for seating said pawl in either the operative or inoperative position of said pawl, a head at the opposite extremity of said pin and seated within the other of the sockets, means on said head for turning said pawl into either operative or inoperative position and for imparting limited sliding movement to said pin to thereby move said pawl from the level of one of said seats to the level of the other of said seats, said bolt being provided with a plurality of spirally arranged longitudinal grooves on the threaded surface of said bolt for engaging said pawl to prevent reverse turning of said nut.

OCTAVE JOSEPH SOUCIE.